United States Patent
Kalyuzhny

(10) Patent No.: US 10,977,511 B2
(45) Date of Patent: *Apr. 13, 2021

(54) OPTICAL CHARACTER RECOGNITION OF SERIES OF IMAGES

(71) Applicant: ABBYY PRODUCTION LLC, Moscow (RU)

(72) Inventor: Aleksey Ivanovich Kalyuzhny, Moscow region (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,140

(22) Filed: Dec. 9, 2019

(65) Prior Publication Data
US 2020/0117935 A1   Apr. 16, 2020

Related U.S. Application Data

(63) Continuation of application No. 15/854,348, filed on Dec. 26, 2017, now Pat. No. 10,503,995.

(30) Foreign Application Priority Data

Dec. 22, 2017   (RU) .......................... RU2017145319

(51) Int. Cl.
| | |
|---|---|
| G06K 9/32 | (2006.01) |
| G06K 9/00 | (2006.01) |
| G06K 9/46 | (2006.01) |
| G06K 9/62 | (2006.01) |
| G06T 3/40 | (2006.01) |
| G06T 3/00 | (2006.01) |

(52) U.S. Cl.
CPC ......... *G06K 9/325* (2013.01); *G06K 9/00449* (2013.01); *G06K 9/00483* (2013.01); *G06K 9/4604* (2013.01); *G06K 9/4642* (2013.01); *G06K 9/6218* (2013.01); *G06K 9/6267* (2013.01); *G06T 3/0093* (2013.01); *G06T 3/40* (2013.01); *G06K 2209/01* (2013.01)

(58) Field of Classification Search
CPC combination set(s) only.
See application file for complete search history.

(56) References Cited

U.S. PATENT DOCUMENTS

| | | | |
|---|---|---|---|
| 5,539,841 A * | 7/1996 | Huttenlocher | G06K 9/6211 382/218 |
| 7,333,676 B2 | 2/2008 | Myers et al. | |
| 9,064,174 B2 | 6/2015 | Nister et al. | |

(Continued)

FOREIGN PATENT DOCUMENTS

WO   2015/165524 A1   11/2015

*Primary Examiner* — Tsung Yin Tsai
(74) *Attorney, Agent, or Firm* — Lowenstein Sandler LLP

(57) ABSTRACT

Systems and methods for performing OCR of a series of images depicting text symbols. An example method comprises performing OCR a series of images to produce a current symbol sequence and corresponding symbol sequence quadrangle; associating the current symbol sequence with a previous symbol sequence for a previously received image; identifying a median string; determining a median symbol sequence quadrangle; and displaying, using the median symbol sequence quadrangle, a resulting OCR text representing at least a portion of the original document.

20 Claims, 8 Drawing Sheets

(56) References Cited

U.S. PATENT DOCUMENTS

| | | | |
|---|---|---|---|
| 10,366,469 B2* | 7/2019 | Zagaynov | G06T 3/0031 |
| 2014/0192210 A1 | 7/2014 | Gervautz et al. | |
| 2015/0169951 A1* | 6/2015 | Khintsitskiy | G06K 9/00483 |
| | | | 382/182 |
| 2015/0213330 A1* | 7/2015 | Chulinin | G06K 9/4647 |
| | | | 382/185 |
| 2017/0330049 A1* | 11/2017 | Kalyuzhny | G06K 9/00449 |
| 2019/0034717 A1* | 1/2019 | Kalyuzhny | G06T 7/70 |
| 2019/0197334 A1* | 6/2019 | Kalyuzhny | G06K 9/4642 |

\* cited by examiner

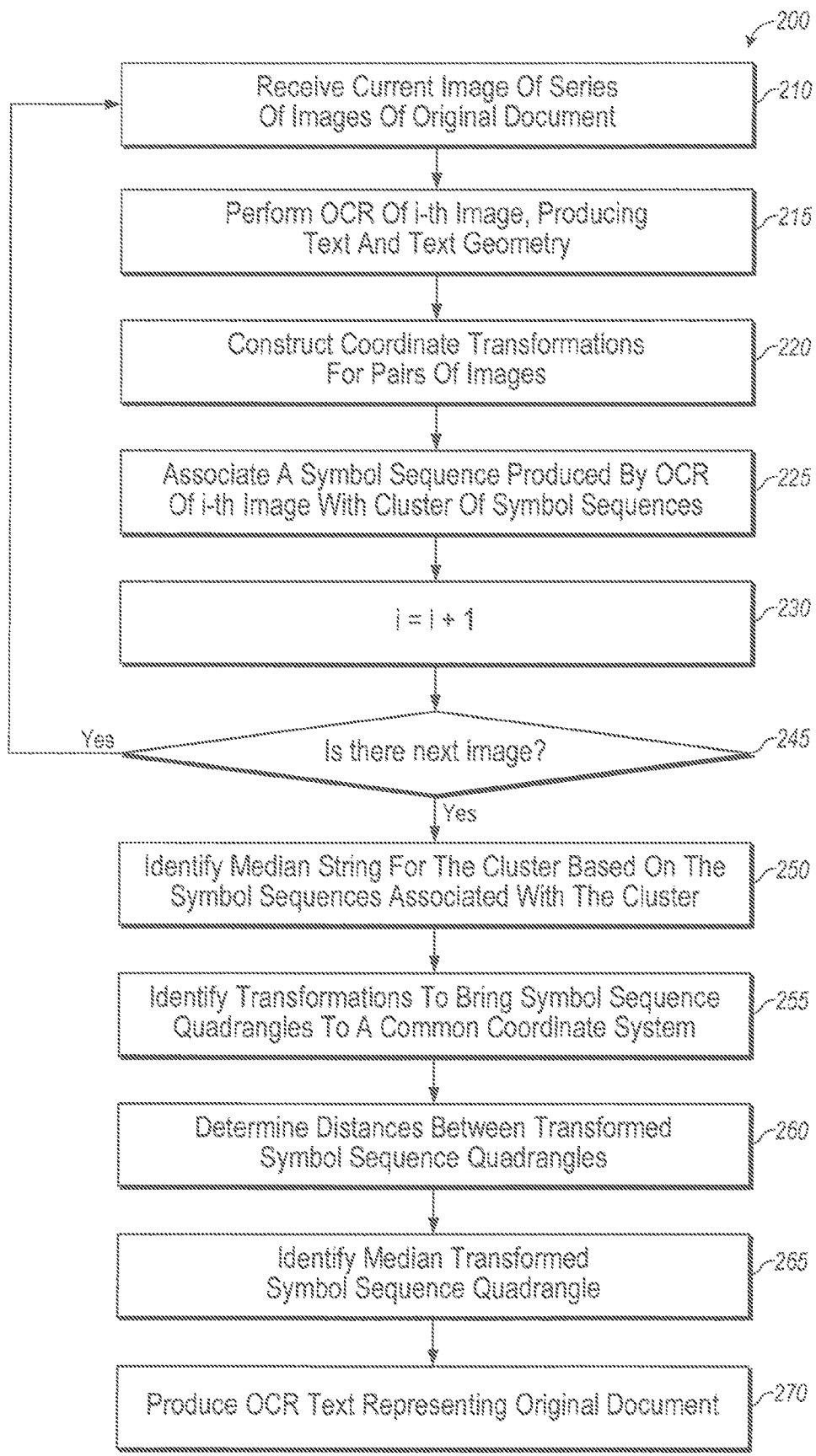

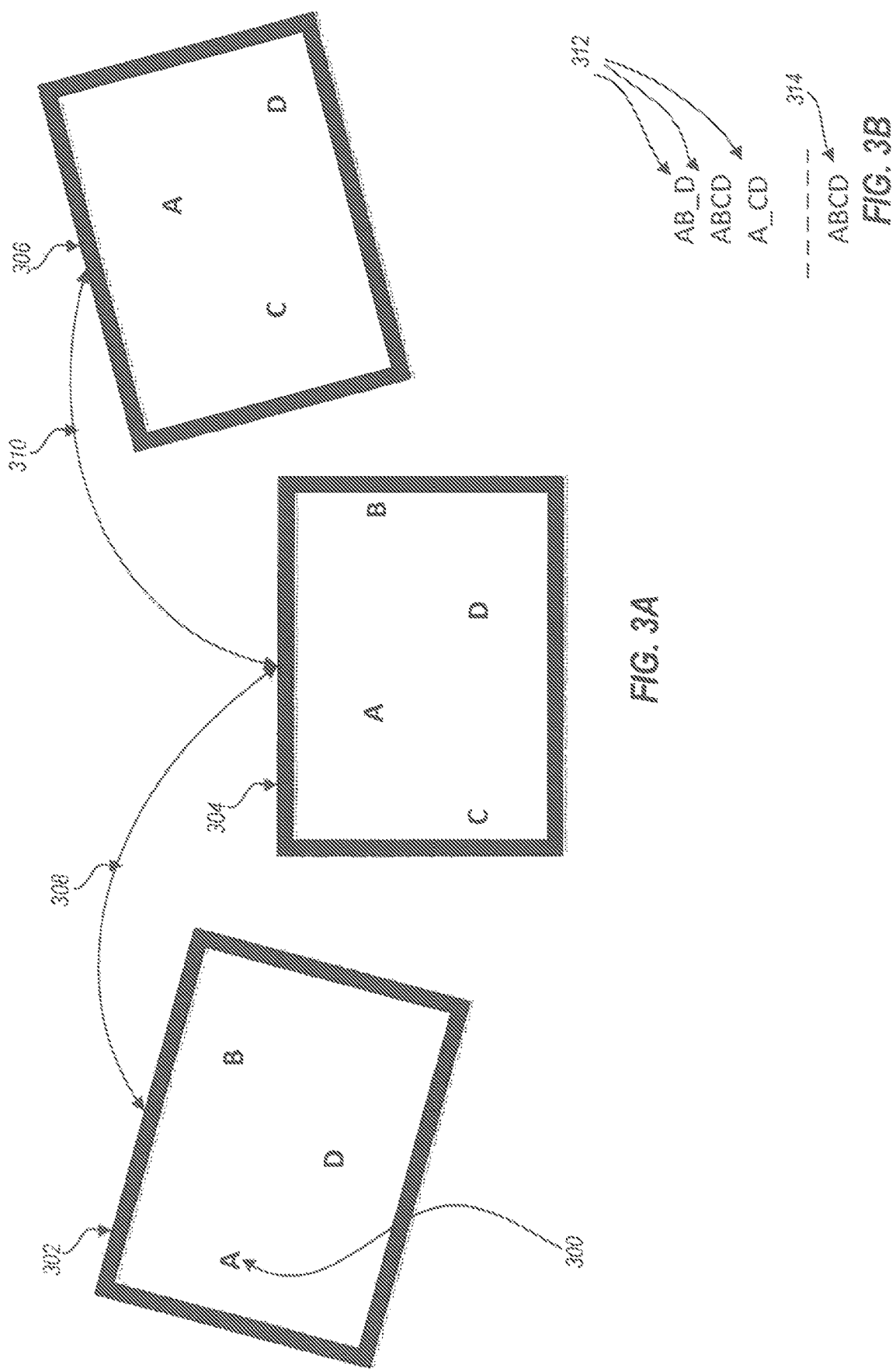

OPTICAL CHARACTER RECOGNITION OF SERIES OF IMAGES

REFERENCE TO RELATED APPLICATIONS

This continuation application claims priority to U.S. patent application Ser. No. 15/854,348 filed on Dec. 26, 2017, which claims priority to Russian Patent Application No. 2017145319 filed Dec. 22, 2017, which are hereby incorporated by reference herein.

TECHNICAL FIELD

The present disclosure is generally related to computer systems, and is more specifically related to systems and methods for optical character recognition (OCR).

BACKGROUND

Optical character recognition (OCR) is a computer-implemented conversion of text images (including typed, handwritten, or printed text) into computer-encoded electronic documents.

SUMMARY OF THE DISCLOSURE

In accordance with one or more aspects of the present disclosure, an example method for performing optical character recognition (OCR) of a series of images depicting symbols of a certain alphabet may comprise: receiving, by a processing device, a current image of a series of images of an original document, wherein the current image at least partially overlaps with a previous image of the series of images; performing optical symbol recognition (OCR) of the current image to produce a current symbol sequence and a corresponding text layout, wherein the text layout of the current image comprises coordinates of a current symbol sequence quadrangle containing the symbol sequence in the current image; associating, using a coordinate transformation, the current symbol sequence with a first cluster of a plurality of clusters of previous symbol sequences, wherein each previous symbol sequence in the first cluster is produced by processing one of the previously received images of the series of images, wherein each of the previously received images has a corresponding previous image text layout comprising coordinates of a previous symbol sequence quadrangle containing the previous symbol sequence; merging the symbol sequences from the first cluster by identifying a first median string representing the first cluster of symbol sequences based on a first subset of images of the series of images, wherein the first median string is a resulting OCR text representing at least a portion of the original document; calculating transformation of the previous symbol sequence quadrangles to the current image to produce transformed previous symbol sequence quadrangles; determining distance between the transformed previous symbol sequence quadrangles and the current symbol sequence quadrangle; identifying a median symbol sequence quadrangle for the previous symbol sequence quadrangles and the current symbol sequence quadrangle based on the distances between the transformed previous symbol sequence quadrangles and the current symbol sequence quadrangle; displaying, using the median symbol sequence quadrangle, a resulting OCR text representing at least a portion of the original document; wherein a distance between the transformed previous symbol sequence quadrangles and the current symbol sequence quadrangle represents a measure of difference in geometry of the symbol sequence quadrangles; wherein the determining distance between the transformed previous symbol sequence quadrangles and the current symbol sequence quadrangle comprises determining projection coefficients for the current symbol sequence quadrangle into a unit square; applying the determined projective transformation to the transformed previous symbol sequence quadrangles to obtain the converted transformed previous symbol sequence quadrangles; wherein the determining distance between the transformed previous symbol sequence quadrangles and the current symbol sequence quadrangle further comprises determining lengths of line segments connecting vertices of the converted transformed previous symbol sequence quadrangles and vertices of the unit square; wherein the identifying of the median symbol sequence quadrangle is a transformed symbol sequence quadrangle, which distance from the current symbol sequence quadrangle is a median to the other distances between the transformed previous symbol sequence quadrangles and the current symbol sequence quadrangle; wherein the lengths of line segments between vertices of the transformed previous symbol sequence quadrangles and vertices of the unit square are weighted; wherein for each recognized symbol of the current recognized symbol sequence the text layout of the current image comprises coordinates of a current symbol rectangle containing the symbol in the current image; wherein the determining distance between the transformed symbol sequence quadrangles and the current symbol sequence quadrangle comprises normalizing the distance between the transformed symbol sequence quadrangles and the current symbol sequence quadrangles by number of symbols in the symbol sequences; wherein displaying, using the median symbol sequence quadrangle, a resulting OCR text further comprises determining symbol quadrangles for symbols of the first median string based on the median symbol sequence quadrangle; determining base lines based on the symbol quadrangles; determining final median symbol sequence quadrangle based on the symbol quadrangles.

In accordance with one or more aspects of the present disclosure, an example system for performing optical character recognition (OCR) of a series of images depicting symbols of a certain alphabet may comprise: a memory; a processing device, coupled to the memory, the processing device configured to: receive, by a processing device, a current image of a series of images of an original document, wherein the current image at least partially overlaps with a previous image of the series of images; perform optical symbol recognition (OCR) of the current image to produce a current symbol sequence and a corresponding text layout, wherein the text layout of the current image comprises coordinates of a current symbol sequence quadrangle containing the symbol sequence in the current image; associate, using a coordinate transformation, the current symbol sequence with a first cluster of a plurality of clusters of previous symbol sequences, wherein each previous symbol sequence in the first cluster is produced by processing one of the previously received images of the series of images, wherein each of the previously received images has a corresponding previous image text layout comprising coordinates of a previous symbol sequence quadrangle containing the previous symbol sequence; merge the symbol sequences from the first cluster by identifying a first median string representing the first cluster of symbol sequences based on a first subset of images of the series of images, wherein the first median string is a resulting OCR text representing at least a portion of the original document;

calculate transformation of the previous symbol sequence quadrangles to the current image to produce transformed previous symbol sequence quadrangles; determine distance between the transformed previous symbol sequence quadrangles and the current symbol sequence quadrangle; identify a median symbol sequence quadrangle for the previous symbol sequence quadrangles and the current symbol sequence quadrangle based on the distances between the transformed previous symbol sequence quadrangles and the current symbol sequence quadrangle; display, using the median symbol sequence quadrangle, a resulting OCR text representing at least a portion of the original document; wherein a distance between the transformed previous symbol sequence quadrangles and the current symbol sequence quadrangle represents a measure of difference in geometry of the symbol sequence quadrangles; wherein the determining distance between the transformed previous symbol sequence quadrangles and the current symbol sequence quadrangle comprises determining projection coefficients for the current symbol sequence quadrangle into a unit square; applying the determined projective transformation to the transformed previous symbol sequence quadrangles to obtain the converted transformed previous symbol sequence quadrangles; wherein the determining distance between the transformed previous symbol sequence quadrangles and the current symbol sequence quadrangle further comprises determining lengths of line segments connecting vertices of the converted transformed previous symbol sequence quadrangles and vertices of the unit square; wherein the identifying of the median symbol sequence quadrangle is a transformed symbol sequence quadrangle, which distance from the current symbol sequence quadrangle is a median to the other distances between the transformed previous symbol sequence quadrangles and the current symbol sequence quadrangle; wherein the lengths of line segments between vertices of the transformed previous symbol sequence quadrangles and vertices of the unit square are weighted; wherein for each recognized symbol of the current recognized symbol sequence the text layout of the current image comprises coordinates of a current symbol rectangle containing the symbol in the current image; wherein the determining distance between the transformed symbol sequence quadrangles and the current symbol sequence quadrangle comprises normalizing the distance between the transformed symbol sequence quadrangles and the current symbol sequence quadrangles by number of symbols in the symbol sequences; wherein displaying, using the median symbol sequence quadrangle, a resulting OCR text further comprises determining symbol quadrangles for symbols of the first median string based on the median symbol sequence quadrangle; determining base lines based on the symbol quadrangles; determining final median symbol sequence quadrangle based on the symbol quadrangles.

In accordance with one or more aspects of the present disclosure, an example computer-readable non-transitory storage medium may comprise executable instructions that, when executed by a processing device, cause the processing device to: receive, by a processing device, a current image of a series of images of an original document, wherein the current image at least partially overlaps with a previous image of the series of images; perform optical symbol recognition (OCR) of the current image to produce a current symbol sequence and a corresponding text layout, wherein the text layout of the current image comprises coordinates of a current symbol sequence quadrangle containing the symbol sequence in the current image; associate, using a coordinate transformation, the current symbol sequence with a first cluster of a plurality of clusters of previous symbol sequences, wherein each previous symbol sequence in the first cluster is produced by processing one of the previously received images of the series of images, wherein each of the previously received images has a corresponding previous image text layout comprising coordinates of a previous symbol sequence quadrangle containing the previous symbol sequence; merge the symbol sequences from the first cluster by identifying a first median string representing the first cluster of symbol sequences based on a first subset of images of the series of images, wherein the first median string is a resulting OCR text representing at least a portion of the original document; calculate transformation of the previous symbol sequence quadrangles to the current image to produce transformed previous symbol sequence quadrangles; determine distance between the transformed previous symbol sequence quadrangles and the current symbol sequence quadrangle; identify a median symbol sequence quadrangle for the previous symbol sequence quadrangles and the current symbol sequence quadrangle based on the distances between the transformed previous symbol sequence quadrangles and the current symbol sequence quadrangle; display, using the median symbol sequence quadrangle, a resulting OCR text representing at least a portion of the original document; wherein a distance between the transformed previous symbol sequence quadrangles and the current symbol sequence quadrangle represents a measure of difference in geometry of the symbol sequence quadrangles; wherein the determining distance between the transformed previous symbol sequence quadrangles and the current symbol sequence quadrangle comprises determining projection coefficients for the current symbol sequence quadrangle into a unit square; applying the determined projective transformation to the transformed previous symbol sequence quadrangles to obtain the converted transformed previous symbol sequence quadrangles; wherein the determining distance between the transformed previous symbol sequence quadrangles and the current symbol sequence quadrangle further comprises determining lengths of line segments connecting vertices of the converted transformed previous symbol sequence quadrangles and vertices of the unit square; wherein the identifying of the median symbol sequence quadrangle is a transformed symbol sequence quadrangle, which distance from the current symbol sequence quadrangle is a median to the other distances between the transformed previous symbol sequence quadrangles and the current symbol sequence quadrangle; wherein the lengths of line segments between vertices of the transformed previous symbol sequence quadrangles and vertices of the unit square are weighted; wherein for each recognized symbol of the current recognized symbol sequence the text layout of the current image comprises coordinates of a current symbol rectangle containing the symbol in the current image; wherein the determining distance between the transformed symbol sequence quadrangles and the current symbol sequence quadrangle comprises normalizing the distance between the transformed symbol sequence quadrangles and the current symbol sequence quadrangles by number of symbols in the symbol sequences; wherein displaying, using the median symbol sequence quadrangle, a resulting OCR text further comprises determining symbol quadrangles for symbols of the first median string based on the median symbol sequence quadrangle; determining base lines based on the symbol quadrangles; determining final median symbol sequence quadrangle based on the symbol quadrangles.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 depicts a flow diagram of one illustrative example of a method for determining geometry of text symbols identified by performing optical character recognition (OCR) of a series of images comprising text symbols, in accordance with one or more aspects of the present disclosure;

FIG. 3A-3B schematically illustrate an example sequence of three images, projective transformations between pairs of images, and the corresponding symbol sequences produced by the OCR of the respective images, in accordance with one or more aspects of the present disclosure;

DETAILED DESCRIPTION

Figure 1A:
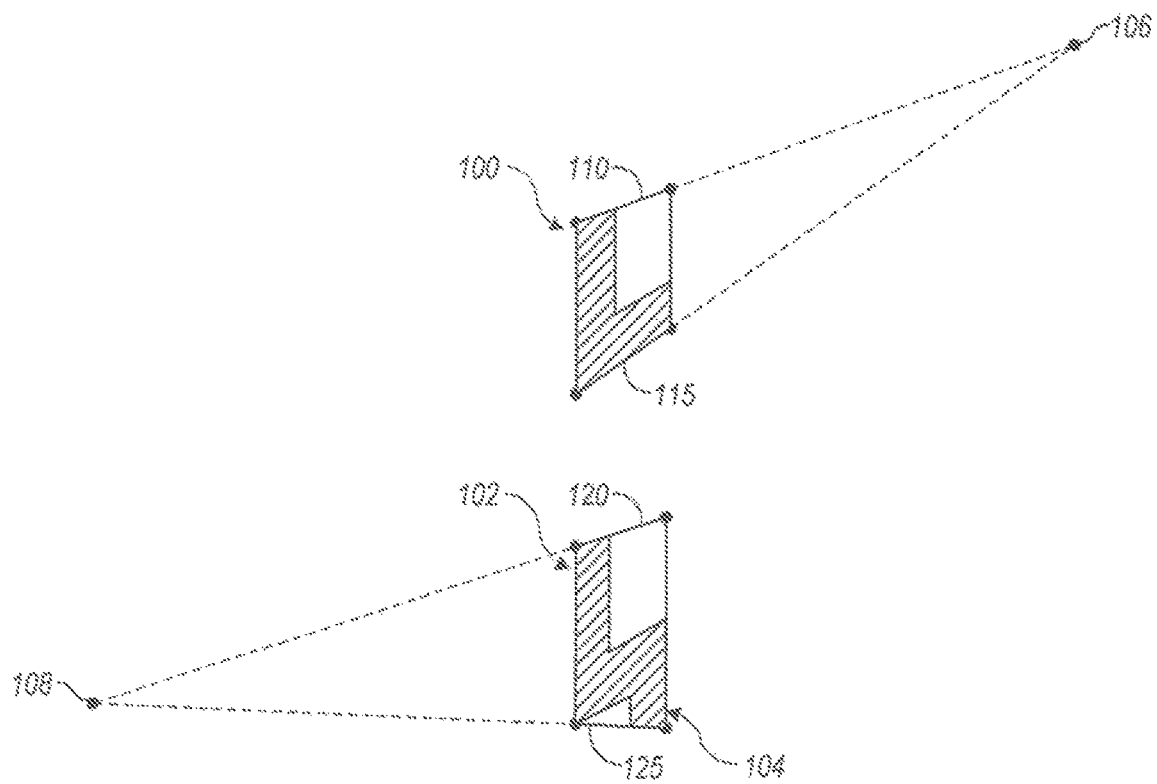
FIGS. 1A-1B schematically illustrates an example symbol quadrangles and symbol sequence quadrangles.

Described herein are methods and systems for performing optical character recognition (OCR) of a series of images of documents depicting symbols of a certain alphabet with optional subsequent data extraction. The alphabets whose symbols may be processed by the systems and methods described herein include true alphabets that have separate symbols, or glyphs, representing individual sounds, as well as hieroglyphic alphabets that have separate symbols representing larger units such as syllables or words.

In the following description, the term "document" shall be interpreted broadly as referring to a wide variety of text carrying media, including but not limited to printed or handwritten paper documents, banners, posters, signs, billboards, and/or other physical objects carrying visible text symbols on one or more of their surfaces. "Document image" herein shall refer to an image of at least a part of the original document (e.g., a page of a paper document).

An OCR system may acquire a document image and transform the acquired image containing text into a computer-readable and searchable format comprising the digitized textual information extracted from the image of the paper document. This digitized textual information may then be presented to a user. In order to present the text to the user the OCR system also detects geometry of the text within the document.

In the following description, the terms "geometry of a text", "geometry of a symbol sequence", "geometry of a symbol" within a document shall be interpreted as a description of a quadrangle circumscribed around such text, symbol sequence, or symbol. Description of such quadrangles includes coordinates of each of its vertices in a coordinate system of the document. Geometry of a text also includes an upper and a lower base line. Lower baseline is a line upon which most letters "sit" and below which only descenders extend. Upper baseline is a line to which most lower-case letters extend and above which only capital letters, diacritics, and ascenders extend. Ideally upper and lower base lines are parallel to each other and a circumscribing quadrangle becomes a rectangle.

When a camera is capturing the image of a document at an angle to the document surface, the objects of interest in such as symbol sequences/symbols and their corresponding circumscribing rectangles within the document are projected on an image plane according to the principle of perspective projection. Under perspective projection two-dimensional projections of two parallel lines of a three-dimensional space converge in a point on the image plane (vanishing points). Thus, the rectangles of symbol sequences/symbols described above will be distorted, and appear as quadrangles whose extensions of opposite sides intersect at certain vanishing points.

The OCR process may be hindered by various image defects, such as visual noise, poor focus or image clarity, glares, etc., which may be routinely caused by the camera shake, inadequate illumination, incorrectly chosen shutter speed or aperture, and/or other conditions and attenuating circumstances. Due to these defects, which may be different in different images of a series of images, OCR results in these images may significantly depart from each other by the type of symbols recognized, as well as the number of recognized symbols in symbol sequences combined in the same cluster, number of words in the symbol sequences combined in the same cluster (two words in recognition results of one image may correspond to a single word in recognition results of another image). Such inconsistencies in OCR results create uncertainty in geometry of a median string determined for the cluster. The systems and methods described herein may significantly improve the accuracy of geometry for the median string by analyzing a series of images (e.g., a sequence of video frames or still images) of the document, as described in more details herein below.

Furthermore, in certain circumstances, the original document cannot be fit into a single image without a significant loss of the image quality. The loss of image quality may be mitigated by acquiring a series of partially overlapping images of multiple fragments of the original document, which, however, may not be suitable for the subsequent OCR processing by common OCR methods. The systems and methods described herein may efficiently combine the results of character recognition and symbol geometry detection performed for the multiple document fragments to produce the text of the original document with its complete original geometry, which includes quadrangle coordinates for all symbols in the text and base lines for each symbol sequence in coordinate system of an image of a series of images.

In certain implementations, the text produced by the OCR systems and methods described herein may be further processed, e.g., by further specific data extraction, data verification and collection.

In an illustrative example, a computer system implementing the methods described herein may receive a series of images (e.g., a sequence of video frames or still images) of the original document. The images may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters.

The computer system may perform OCR of at least selected images of the received series of images to produce the corresponding text and geometry of the recognized text. The geometry information may associate the recognized symbols and/or groups of symbols with coordinates of their respective circumscribed quadrangles in the original image. In order to combine the results of character recognition and geometry detection performed for consecutively received images, the computer system may compare the text and geometries produced by OCR of the currently received image with the text and geometries produced by OCR of one or more of previously processed images.

In accordance with one or more aspects of the present disclosure, the computer system may identify clusters of symbol sequences that are likely to represent the same fragment of the original document. These aspects of the present invention are described in details in U.S. patent application Ser. No. 15/168,548, entitled "OPTICAL CHARACTER RECOGNITION OF SERIES OF IMAGES" by Aleksey Kalyuzhny, filed on May 31, 2016.

For each cluster of matching symbol sequences, the median string representing the OCR result of the associated image fragment may be identified. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

The texts produced by the OCR of each individual image may differ by one or more words being present or absent in each OCR result, by variations in the symbol sequences representing the words of the original text, by the order of the symbol sequences and/or by presence of so-called "garbage" symbols, i.e. artefacts generated by the system as a result of the defects in the images, that do not exist in the document.

The geometries of texts produced by the OCR of each individual image may be determined with inaccuracies and therefore differ by location of corresponding quadrangles, their size, angle of their edges, vanishing points etc. These reasons for such differences may be illustrated by FIG. 1A.

FIG. 1A depicts representation of two symbols 100 and 102 in two different images, which correspond to the same symbol in the document. For symbol 100, due to image distortion, the upper baseline 110 and lower base line 115 are not parallel. They cross at a vanishing point 106. Symbol 102 differs from symbol 100 by an artefact 104. Such artefact may be created by an OCR system due to image noise, glare, poor lighting, etc. Due to this artefact 104, the upper based line 120 and the lower baseline 125 of the symbol 102 cross at a different vanishing point 108. In other words from these two images it is not possible to determine the upper and the lower baselines for symbol 100, 102.

When a series of matching symbol sequences are combined, we find a median string or a resulting OCR text for such series of symbol sequences. For a series of quadrangles corresponding to these symbol sequences we also need to determine a median symbol sequences quadrangle, most suitable quadrangle based on which the best quadrangle circumscribing the median string may be identified. Finding such the best symbol sequence geometry, most suitable for the median symbol sequence, is one of the objects of this invention.

Various aspects of the above referenced methods and systems are described in details herein below by way of examples, rather than by way of limitation.

FIG. 2 depicts a flow diagram of one illustrative example of a method 200 for performing OCR of a series of images comprising text symbols, in accordance with one or more aspects of the present disclosure. Method 200 and/or each of its individual functions, routines, subroutines, or operations may be performed by one or more processors of the computer system (e.g., example computer system 800 of FIG. 8) executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. Therefore, while FIG. 2 and the associated description lists the operations of method 200 in certain order, various implementations of the method may perform at least some of the described operations in parallel and/or in arbitrary selected orders.

For clarity and conciseness, the present description assumes that the processing of each image of an original document is initiated after the image is received by the computer system implementing the method, and that such processing is substantially completed before the next image is received. However, in various alternative implementations, processing of consecutive images may overlap in time (e.g., may be performed by different threads or processes that are running on one or more processors). Alternatively, two or more images may be buffered and processed asynchronously with respect to receiving the other images of a plurality of images received by the computer system implementing the method.

The present disclosure references "a pair of images" of a series of images (e.g., a sequence of video frames or still images) of the original document. The images may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. In an illustrative example, the pair of images may be selected among two or more consecutive images of the received series of images. The two images are individually referenced herein as "the current image" (also referred to as "i-th image" in FIG. 2) and "the previous image" (also referred to as "(i−1)-th image" in FIG. 2).

At block 210, the computer system implementing the method may receive the current image of the series of images.

Figure 1B:
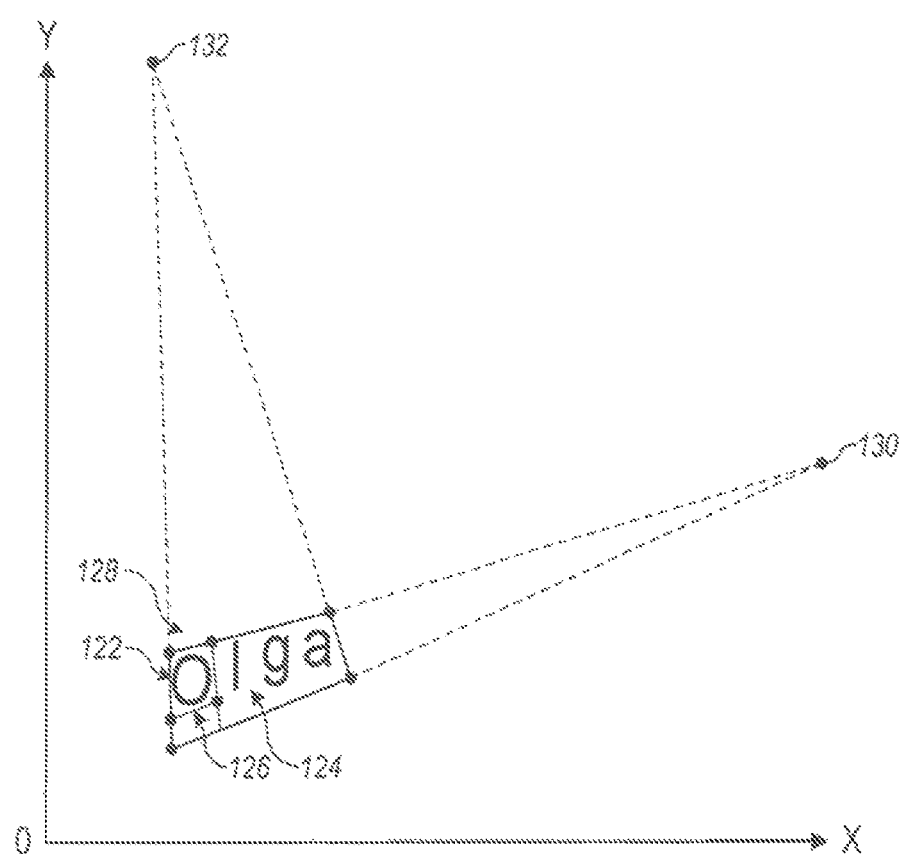

At block 215, the computer system may perform the optical character recognition of the current image, thus producing the recognized text and text geometry information. The text geometry information may include coordinates for vertices of quadrangles circumscribing the recognized symbols and/or sequences of symbols in coordinate system of the image. FIG. 1B depicts an illustrative example of a circumscribing quadrangle 128 of a symbol sequence "Olga" 124. Symbol "O" 122 is circumscribed by quadrangle 126. Quadrangles 126 and 128 are projections of originally parallel baselines of these quadrangles onto image plane 120. Opposite sides of these quadrangles 126 and 128 cross in their respective vanishing points 130 and 132.

At block 220, the computer system may construct the coordinate transformation converting coordinates of one image of the pair of images into coordinates of another image of the pair of images. The present method assumes that, at least for the chosen pairs of images, coordinates of an arbitrary chosen point in the first image may be produced by applying a projective transformation to the coordinates of the same point in the second image. The method for identifying base points in a series of images in described in detail in U.S. patent application Ser. No. 15/168,548, entitled "OPTICAL CHARACTER RECOGNITION OF SERIES OF IMAGES" by Aleksey Kalyuzhny, filed on May 31, 2016 which is incorporated herein in its entirety.

"Projective transformation" herein refers to a transformation that maps lines to lines, but does not necessarily preserve parallelism. A projective transformation can be expressed by the following equations:

$$X = \frac{Ax_1 * x + Ax_2 * y + Ax_3}{Ax_4 * x + Ay_4 * y + 1} \quad (1)$$

$$Y = \frac{Ay_1 * x + Ay_2 * y + Ay_3}{Ax_4 * x + Ay_4 * y + 1} \quad (2)$$

wherein (x,y) and (X,Y) represent coordinates of an arbitrary chosen point in the first image and the second image, respectively. The transformation coefficients $Ax_1$, $Ax_2$, $Ax_3$, $Ax_4$, $Ay_1$, $Ay_2$, $Ay_3$, and $Ay_4$ may be determined based on known coordinates of at least four base points in each of the two images, which would produce a system of eight equations with eight variables. Once the transformation coefficients have been determined, the equations (1) and (2) may be applied to coordinates of an arbitrary chosen point in the first image in order to determine coordinates of the same point in the second image.

FIG. 3A schematically illustrates a sequence of three images 302, 304, and 306, such that the coordinates of the first image 302 may be translated into the coordinates of the second image 304 by applying the projective transformation 308, and the coordinates of the second image 304 may be translated into the coordinates of the third image 306 by applying the projective transformation 310.

At block 225, the computer system may associate one or more symbol sequences produced by OCR of the current image with a cluster of matching symbol sequences produced by OCR of the previously processed images. The computer system may employ the above-referenced coordinate transformations to compare positions of recognized symbol sequences in the current and previous images, and thus identify groups of symbol sequences that are likely to represent the same fragment of the original document.

In an illustrative example, for an arbitrary chosen symbol sequence in a text produced by the optical character recognition of the current image, the method may identify one or more matching symbol sequences produced by the optical character recognition of other images of the series of images. Notably, "matching symbol sequences" herein refers to both strictly matching and fuzzily matching symbol sequences. In an illustrative example of FIG. 3B, the three matching symbol sequences 312, corresponding to the images 302, 304, and 306, are represented by three different sequences, which are fuzzily matched by the methods described herein.

Figure 4:
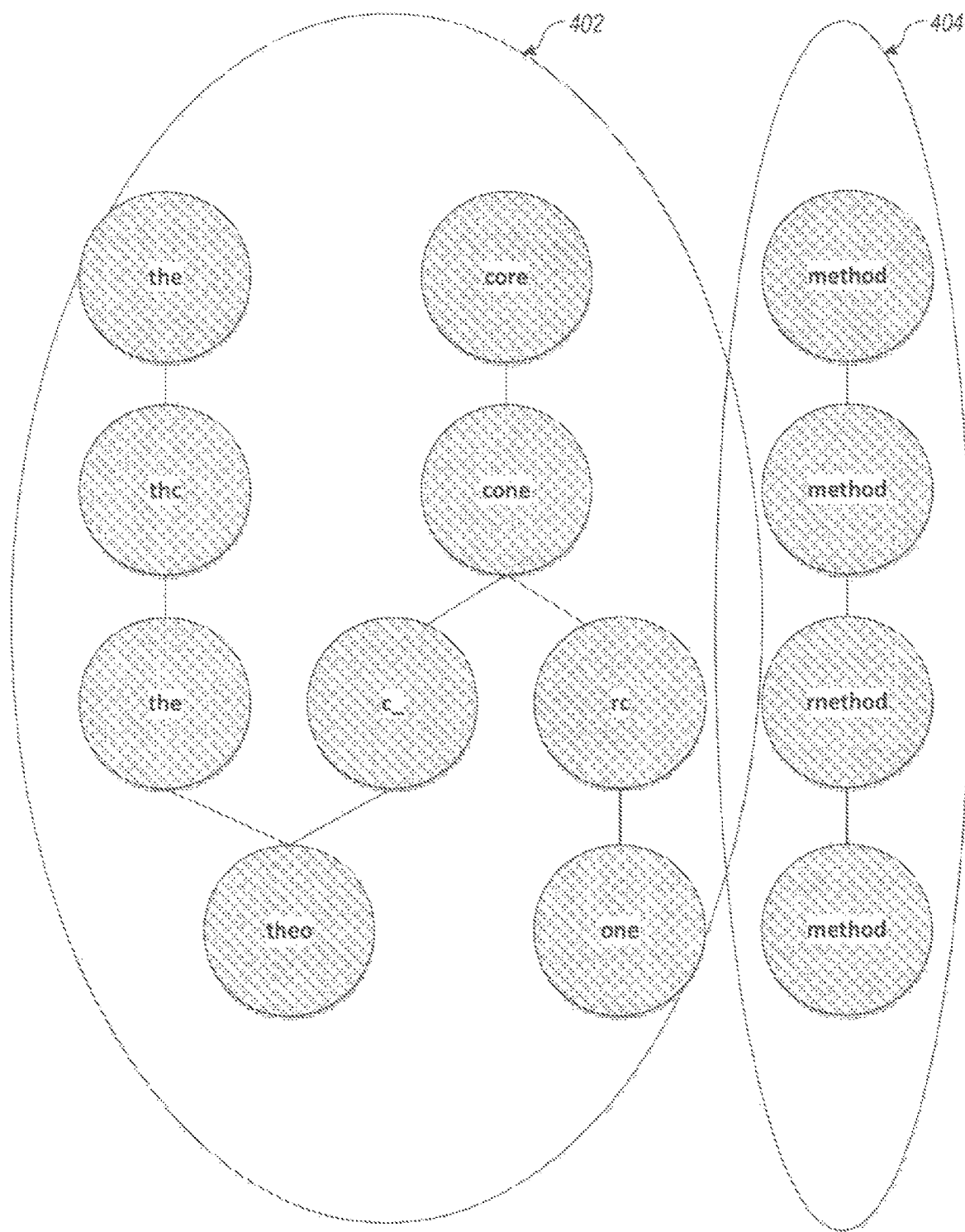
FIG. 4 schematically illustrates an example graph comprising a plurality of clusters of vertices, such that each cluster represents two or more matching symbol sequences, in accordance with one or more aspects of the present disclosure.

In certain implementations, the computer system may produce a graph, the vertices of which represent symbol sequences from the plurality of images, and edges interconnect the symbol sequences that have been identified as matching (i.e., representing the same fragment of the original text) by applying the above-referenced inter-image coordinate transformations. As schematically illustrated by FIG. 4, the resulting graph would comprise a plurality of clusters of vertices, such that each cluster represents two or more matching symbol sequences. The vertices within each cluster are interconnected by respective edges, while individual clusters may be isolated or weakly connected to each other. FIG. 4 shows two clusters (402, 404) representing OCR produced symbol sequences for two original strings: "the core" and "method."

Referring again to FIG. 2, at block 230, the computer system may increment the counter referencing the current image in the series of images. Notably, operations of block 230 are presented in FIG. 2 for readability of the associated description, and may be omitted in various implementations of the method.

At block 245, the computer system may determine whether there is a next image; if so, the method may loop back to block 210.

At block 250, the computer system may identify the median string of each cluster of matching symbol sequences, such that the identified median string would represent the OCR result of the associated image fragment.

Figure 5A:
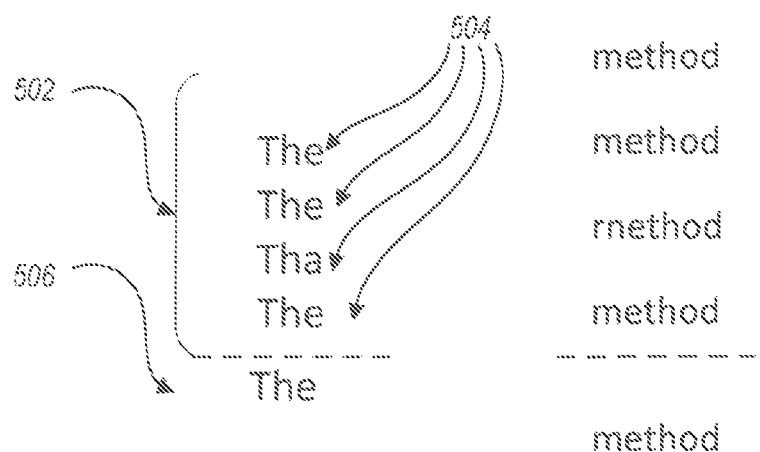
FIGS. 5A-5C schematically illustrate identifying the median string among a plurality of symbol sequences representing the OCR results of the corresponding image fragments, in accordance with one or more aspects of the present disclosure.

As schematically illustrated by FIG. 5A, each cluster 502 may comprise a plurality of matching symbol sequences 504, and the OCR result of the associated image fragment may be represented by the median string 506. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

Figure 5B:
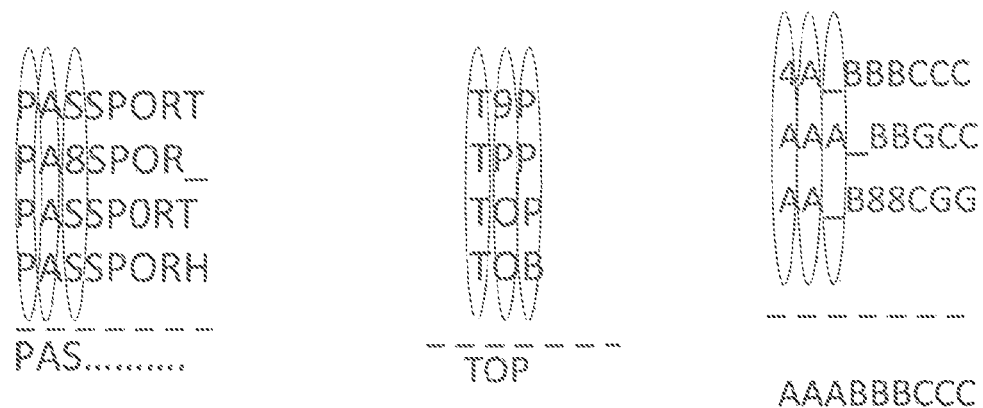
Figure 5C:
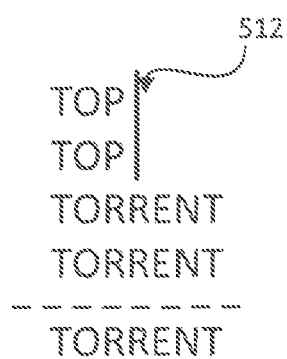

In certain implementations, the computational complexity of identifying the median string may be reduced by applying certain heuristics methods. In an illustrative example, the computer system may heuristically identify the zeroth-order approximation of the median string. The computer system may then align the symbol sequences using strictly matching symbols within each sequence, as schematically illustrated by FIG. 5B. In another illustrative example, the computer system may associate, with each symbol sequence of the cluster, a weight coefficient reflecting the position of the symbol sequence within the image or the OCR confidence metric. As schematically illustrated by FIG. 5C, a cluster 512 comprises four symbol sequences TOP, TOP, TOR-RENT, TORRENT. The first two symbol sequences represent partial words, since the distance from an edge of the minimum bounding rectangle of the symbol sequence to the edge of the image is less than the whitespace width. Therefore the OCR confidence metric value for the first two symbol sequences is significantly less than the OCR confidence metric value for the remaining two symbol sequences, and hence the symbol sequence TORRENT would be chosen as the median string by the method that takes into account the OCR confidence values.

Referring back to FIG. 2, at block 255, the computer system may identify projective transformations of previous symbol sequence quadrangles into a common coordinate system. In some implementations the coordinate system of the current image is used as a common coordinate system. In order to identify such projective transformations for a specific cluster, the system identifies a set of symbol sequence quadrangles, associated with symbol sequences representing this cluster in the current and previous images. As described at block 215, for each of these symbol sequences the OCR system determined its geometry, i.e. coordinates for vertices of quadrangles circumscribing the symbol sequences in coordinate system of the corresponding image. Using projective transformation formulas (1) and (2) the system recalculates symbol sequence quadrangles from previous images into coordinate system of the current image (or whichever image is chosen for a common coordinate system).

Figure 6A:
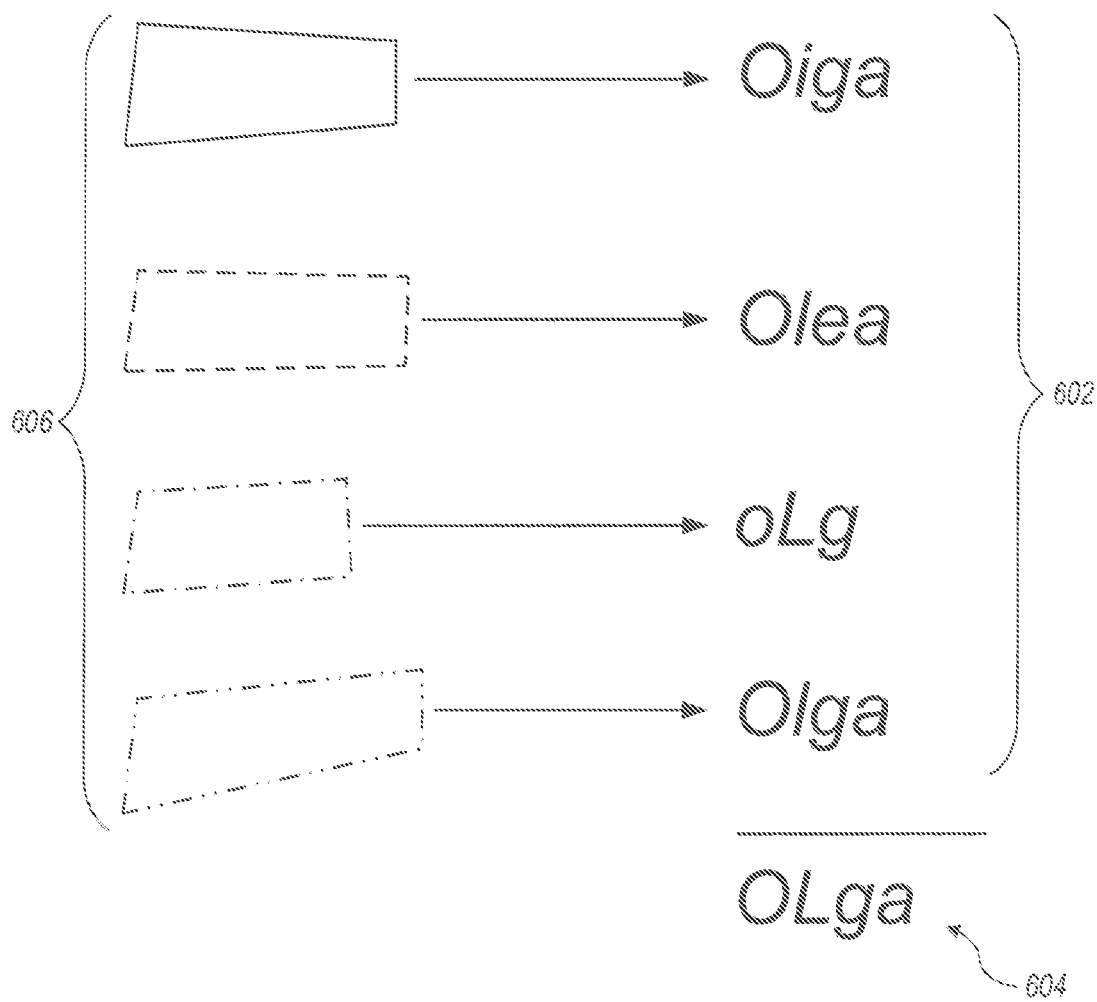
FIGS. 6A-6B schematically illustrates a series of symbol sequence quadrangles and their projective transformation to the same coordinate system.
Figure 6B:
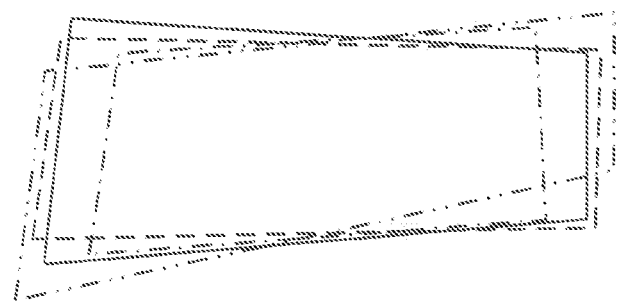

As an illustrative example, FIG. 6A depicts symbol sequence quadrangles 606 corresponding to symbol sequences 602. Symbol sequences 602 are different OCR results from four previous images corresponding to the same cluster. Present invention is directed to determining geometry for a median string 604 of this cluster. FIG. 6B depicts the symbol sequence quadrangles 606 after they were brought to a common coordinate system (for instance, the coordinate system of the current image). As you can see, the quadrangles are all slightly different from each other. As explained above, these differences originated from errors in determining symbol sequence geometry in the previous images, by differences in recognized symbol sequences in these images.

Each of these transformed symbol sequence quadrangles represents a hypothesis of median string quadrangle, i.e. a quadrangle that we need to calculate for the median string. To identify the best hypothesis we need to identify a median symbol sequence quadrangle for this set of symbol sequence quadrangles. In order to calculate such median we need to define a measure of distance between symbol sequence quadrangles. Here a distance between two symbol sequence quadrangles represents the measure of difference in geometry of these two quadrangles.

At block 260 the system determines distances between the symbol sequence quadrangles.

In some implementations, the distance between two symbol sequence quadrangles is determined by first converting the current symbol sequence quadrangle into a unit square, then applying the same conversion to the transformed previous symbol sequence quadrangles and then determining the differences between such converted transformed symbol sequence quadrangles.

Direct conversion into a unit square may be calculated using the following formulas:

$$X = \frac{a*x + b*y}{n*x + m*y + 1} \quad (3)$$

$$Y = \frac{c*x + d*y}{n*x + m*y + 1} \quad (4)$$

where (x, y)—are coordinates of vertices of a symbol sequence quadrangle (which have been determined at block 255;

(X,Y)—are coordinates of vertices of a unit square (which are also known as (0,1), (1,1), (1,0), (0,0);

a,b,c,d,n,m—are unknown coefficients.

To calculate coordinates of the quadrangle converted to the unit square, we calculate the unknown coefficients a, b, c, d, n, m by resolving a system of equations with 6 variables. After coefficients are determined, formulas (3) and (4) can be used to convert coordinates of any vertex of the transformed symbol sequence quadrangle into the unit square.

Figure 6C:
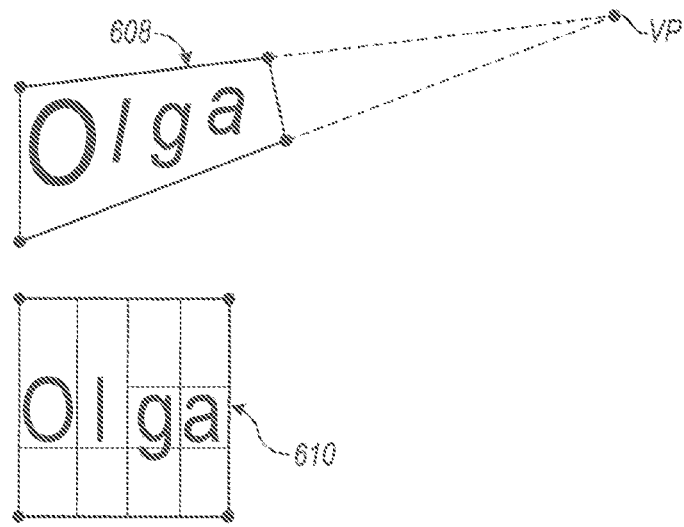
FIG. 6C illustrates conversion of a current symbol sequence quadrangle into a unit square.

FIG. 6C illustrates conversion of a current symbol sequence quadrangle 608 into a corresponding unit square 610.

Figure 6D:
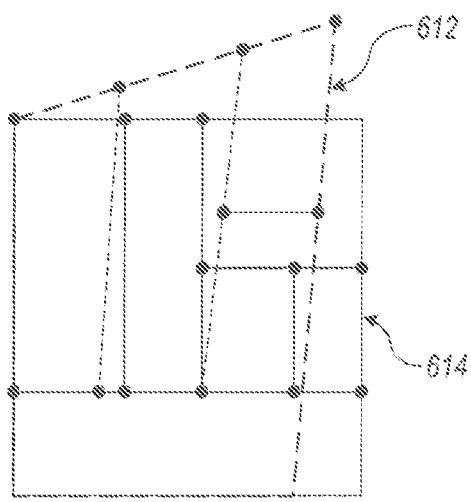
FIG. 6D illustrates differences between a unit square and a converted transformed previous symbol sequence quadrangle.

After coefficients a,b,c,d,n,m are determined for a current symbol sequence quadrangle, the formulas (3) and (4) are used with these coefficients to convert the transformed previous symbol sequence quadrangles to the coordinate system of the unit square. These converted transformed previous symbol sequence quadrangles are going to be different from the unit square due to differences between the current symbol sequence quadrangle and the transformed previous symbol sequence quadrangles. FIG. 6D illustrates differences between the unit square 602 (converted from the current symbol sequence quadrangle) and the converted transformed previous symbol sequence quadrangle 604.

Next the system may determine the distances between the converted transformed previous symbol sequence quadrangles and the unit square. In some implementations these distance is measured by calculating the sum of lengths of line segments between vertices of the converted transformed previous symbol sequence quadrangles and the corresponding vertices of the unit square using the following formula:

$$\xi = \Sum_{i=1}^{4} l_i \quad (5),$$

where $\xi$—a distance between a converted transformed previous symbol sequence quadrangle and the unit square;

$l_i$—the distance between the ith vertex of the converted transformed previous symbol sequence quadrangle and the corresponding vertex of the unit square.

Figure 7:
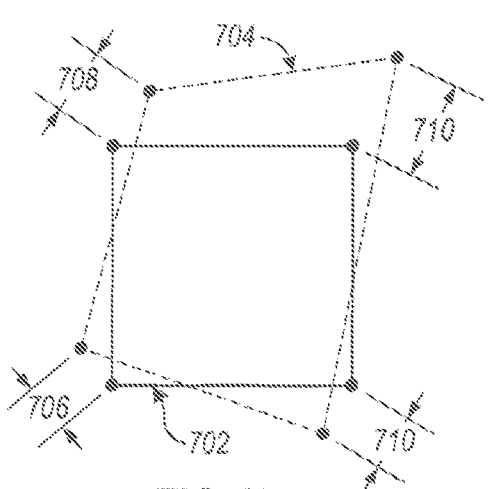
FIG. 7 schematically illustrates an example method of determination of a distance between a converted transformed previous symbol sequence quadrangle and a unit square.

FIG. 7 illustrates the calculation of the distance between the converted transformed previous symbol sequence quadrangle 704 and the unit square 702. The lengths of line segments between the vertices of the converted transformed previous symbol sequence quadrangles and the corresponding vertices of the unit square $l_1, l_2, l_3, l_4$ are marked as 706, 708, 710, 712.

In other implementations the distances between the transformed symbol sequence quadrangles and current symbol sequence quadrangle are determined by other methods. For instance, the distance may be measured by an area of non-intersecting portions of the quadrangles.

In some implementations the calculated distances between the transformed symbol sequence quadrangles and current symbol sequence quadrangle are also normalized by the number of symbols in the corresponding symbol sequence. In this case the distance between symbol sequence quadrangles is determined by calculating a sum of differences between corresponding symbol quadrangles and then normalizing the sum of these differences by the number of symbols in each particular symbol sequence.

At block 265, after the distances between the symbol sequence quadrangles are determined, the system identifies the most suitable symbol sequence quadrangle or a median symbol sequence quadrangle based on which the best median string quadrangle circumscribing the median string may be calculated. In some implementations, the system chooses as the most suitable transformed symbol sequence quadrangle, the transformed symbol sequence quadrangle which distance from the current symbol sequence quadrangle is a median to the other distances between the previous transformed symbol sequence quadrangles and the current symbol sequence quadrangle.

In some implementations, weights are used when calculating the distances between the previous transformed symbol sequence quadrangles and the current symbol sequence quadrangle. For instance, such distances may be multiplied by a coefficient that depends on a number of frames between the previous image, for which the distance is being calculated, and the current image.

In some implementations, after the median symbol sequence quadrangle is determined, at block 268, the system may calculate a median string quadrangle, i.e. a quadrangle circumscribing the median string. First, for each symbol from the median string (identified at block 250 of FIG. 1) the system may identify a symbol quadrangle most compatible to the median symbol sequence quadrangle. In one embodiment the most compatible symbol quadrangle for a symbol may be a symbol quadrangle associated with an image characterized by the most closest placement to the image that corresponds to the median symbol sequence quadrangle in a series of images (identified at block 265 of FIG. 1), straightened according to the geometry of the median symbol sequence quadrangle. In another embodiment the most compatible symbol quadrangle may be a weighted average symbol quadrangle transformed to the coordinate system of the image that corresponds to the median symbol sequence quadrangle in a series of images (identified at block 265 of FIG. 1). Then the system identifies average base lines and determines the median string quadrangle as sum of these most compatible symbol quadrangles.

At block 270, the system produces OCR results representing the original document. This representation is based on the median string and the median string quadrangle, i.e. the median string, determined in block 250 is displayed as inscribed within the median string quadrangle, determined in block 268.

In various implementations, the operations described by blocks 250-265 may be performed in the reverse sequence or in parallel. Alternatively, certain implementations may omit certain operations described by blocks 250-265.

Figure 8:
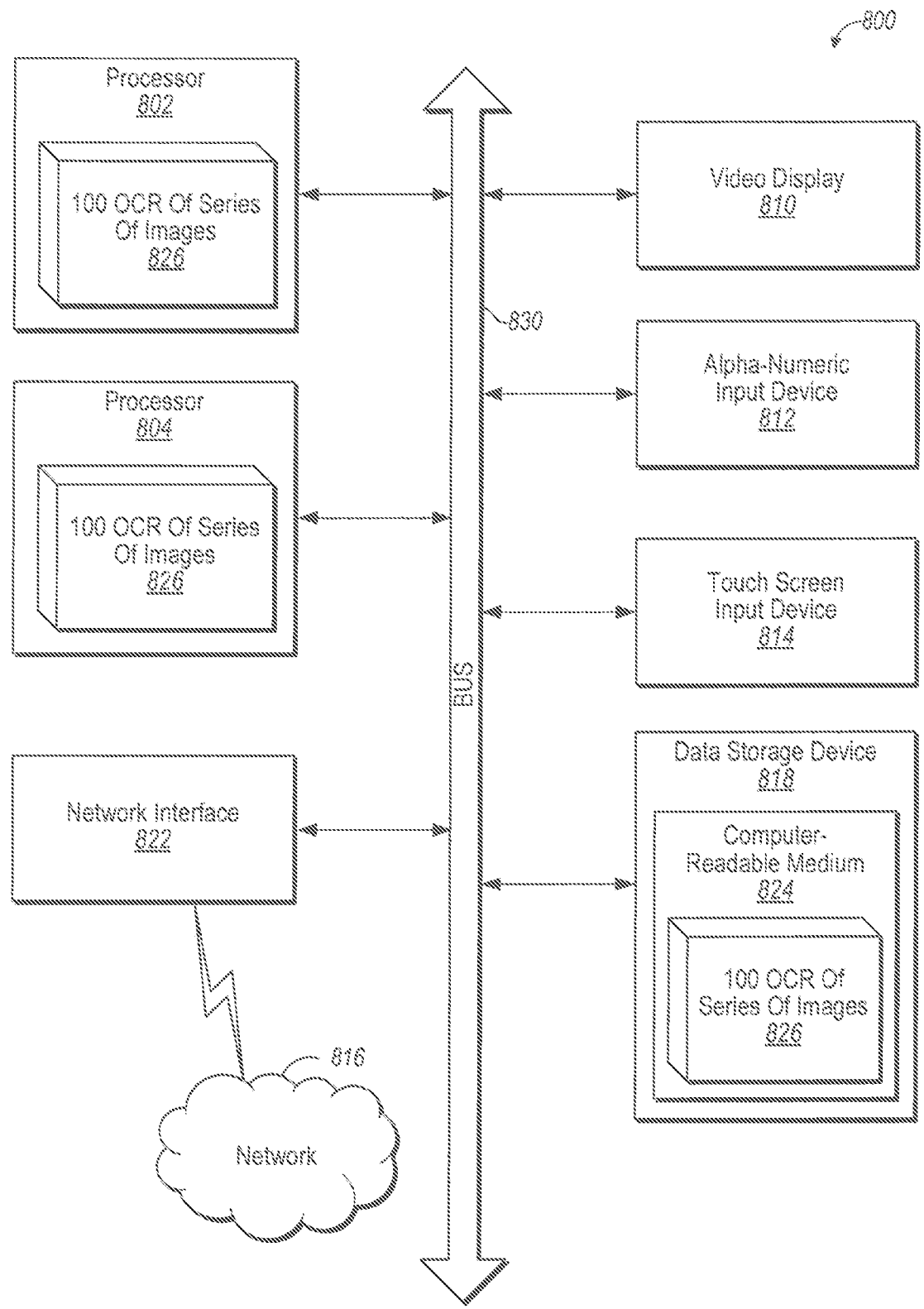
FIG. 8 depicts a diagram of an illustrative example of a computer system implementing the methods described herein.

FIG. 8 depicts a component diagram of an example computer system 800 within which a set of instructions, for causing the computer system to perform any one or more of the methods discussed herein, may be executed. The computer system 800 may be connected to other computer system in a LAN, an intranet, an extranet, or the Internet. The computer system 800 may operate in the capacity of a server or a client computer system in client-server network environment, or as a peer computer system in a peer-to-peer (or distributed) network environment. The computer system 800 may be provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 800 includes a processor 802, a main memory 804 (e.g., read-only memory (ROM) or dynamic random access memory (DRAM)), and a data storage device 818, which communicate with each other via a bus 830.

Processor 802 may be represented by one or more general-purpose processing devices such as a microprocessor, central processing unit, or the like. More particularly, processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute instructions 826 for performing the operations and functions of method 100 for performing OCR of a series of images comprising text symbols, as described herein above.

Computer system 800 may further include a network interface device 822, a video display unit 810, a character input device 812 (e.g., a keyboard), and a touch screen input device 814.

Data storage device 818 may include a computer-readable storage medium 824 on which is stored one or more sets of instructions 826 embodying any one or more of the methods or functions described herein. Instructions 826 may also reside, completely or at least partially, within main memory 804 and/or within processor 802 during execution thereof by computer system 800, main memory 804 and processor 802 also constituting computer-readable storage media. Instructions 826 may further be transmitted or received over network 816 via network interface device 822.

In certain implementations, instructions 826 may include instructions of method 200 for performing OCR of a series of images comprising text symbols, as described herein above. While computer-readable storage medium 824 is shown in the example of FIG. 8 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    receiving, by a processing device, a current image of a series of images of an original document, wherein the current image at least partially overlaps with a previously received image of the series of images;
    performing optical character recognition (OCR) of the current image to produce a current symbol sequence and coordinates of a current symbol sequence quadrangle containing the symbol sequence in the current image;
    associating, using a coordinate transformation, the current symbol sequence with a previous symbol sequence for the previously received image, wherein the previously received image has corresponding coordinates of a previous symbol sequence quadrangle containing the previous symbol sequence;
    identifying a first median string representing the previous symbol sequence based on a first subset of previously received images of the series of images, wherein the first median string is a resulting OCR text representing at least a portion of the original document;
    determining, by the processing device, a median symbol sequence quadrangle for the previous symbol sequence quadrangles and the current symbol sequence quadrangle; and
    displaying, using the median symbol sequence quadrangle, a resulting OCR text representing at least a portion of the original document.

2. The method of claim 1, further comprising:
    calculating a transformation of the previous symbol sequence quadrangle to the current image to produce a transformed previous symbol sequence quadrangle; and
    determining a distance between the transformed previous symbol sequence quadrangle and the current symbol sequence quadrangle.

3. The method of claim 2 wherein a distance between the transformed previous symbol sequence quadrangle and the current symbol sequence quadrangle represents a measure of difference in geometry of the symbol sequence quadrangles, and wherein determining the distance between the transformed previous symbol sequence quadrangle and the current symbol sequence quadrangle comprises:
    determining a projection coefficient for the current symbol sequence quadrangle into a unit square; and
    applying the determined projective transformation to the transformed previous symbol sequence quadrangle to obtain a converted transformed previous symbol sequence quadrangle.

4. The method of claim 3 wherein determining the distance between the transformed previous symbol sequence quadrangle and the current symbol sequence quadrangle further comprises:
    determining lengths of line segments connecting vertices of the converted transformed previous symbol sequence quadrangle and vertices of the unit square.

5. The method of claim 2 wherein determining the median symbol sequence quadrangle comprises:
    identifying a transformed symbol sequence quadrangle at a distance from the current symbol sequence quadrangle that is a median to other distances between the transformed previous symbol sequence quadrangle and the current symbol sequence quadrangle.

6. The method of claim 4 wherein the lengths of line segments between vertices of the transformed previous symbol sequence quadrangle and vertices of the unit square are weighted.

7. The method of claim 2 wherein each recognized symbol of the current symbol sequence is associated with a current symbol rectangle containing the symbol in the current image.

8. The method of claim 7 wherein determining the distance between the transformed symbol sequence quadrangle and the current symbol sequence quadrangle comprises:

normalizing the distance between the transformed symbol sequence quadrangle and the current symbol sequence quadrangle by number of symbols in the symbol sequences.

9. The method of claim 1, wherein displaying, using the median symbol sequence quadrangle, a resulting OCR text further comprises:

determining symbol quadrangles for symbols of the first median string based on the median symbol sequence quadrangle;

determining base lines based on the symbol quadrangles; and determining a median string quadrangle based on the symbol quadrangles.

10. A system, comprising:

a memory;

a processing device, coupled to the memory, the processing device configured to:

receive a current image of a series of images of an original document, wherein the current image at least partially overlaps with a previously received image of the series of images;

perform optical character recognition (OCR) of the current image to produce a current symbol sequence and coordinates of a current symbol sequence quadrangle containing the symbol sequence in the current image;

associate, using a coordinate transformation, the current symbol sequence with a previous symbol sequence for the previously received image, wherein the previously received image has corresponding coordinates of a previous symbol sequence quadrangle containing the previous symbol sequence;

identify a first median string representing the previous symbol sequence based on a first subset of previously received images of the series of images, wherein the first median string is a resulting OCR text representing at least a portion of the original document;

determine a median symbol sequence quadrangle for the previous symbol sequence quadrangles and the current symbol sequence quadrangle; and display, using the median symbol sequence quadrangle, a resulting OCR text representing at least a portion of the original document.

11. The system of claim 10 further comprising:

calculate transformations of the previous symbol sequence quadrangles to the current image to produce transformed previous symbol sequence quadrangles; and determine distances between the transformed previous symbol sequence quadrangles and the current symbol sequence quadrangle.

12. The system of claim 11 wherein a distance between the transformed previous symbol sequence quadrangles and the current symbol sequence quadrangle represents a measure of difference in geometry of the symbol sequence quadrangles, and wherein to determine the distance between the transformed previous symbol sequence quadrangles and the current symbol sequence quadrangle, the processing device is further to:

determining projection coefficients for the current symbol sequence quadrangle into a unit square; and applying the determined projective transformation to the transformed previous symbol sequence quadrangles to obtain a converted transformed previous symbol sequence quadrangles.

13. The system of claim 12 wherein determining the distances between the transformed previous symbol sequence quadrangle and the current symbol sequence quadrangle further comprises:

determining lengths of line segments connecting vertices of the converted transformed previous symbol sequence quadrangle and vertices of the unit square.

14. The system of claim 11 wherein determining the median symbol sequence quadrangle comprises:

identifying a transformed symbol sequence quadrangle, at a distance from the current symbol sequence quadrangle that is a median to other distances between the transformed previous symbol sequence quadrangle and the current symbol sequence quadrangle.

15. The system of claim 13 wherein the lengths of line segments between vertices of the transformed previous symbol sequence quadrangles and vertices of the unit square are weighted.

16. The system of claim 11 wherein each recognized symbol of the current symbol sequence is associated with coordinates of a current symbol rectangle containing the symbol in the current image.

17. The system of claim 16 wherein determining the distances between the transformed symbol sequence quadrangles and the current symbol sequence quadrangle comprises:

normalizing the distances between the transformed symbol sequence quadrangle and the current symbol sequence quadrangles by number of symbols in the symbol sequences.

18. The system of claim 10, wherein displaying, using the median symbol sequence quadrangle, a resulting OCR text further comprises:

determining symbol quadrangles for symbols of the first median string based on the median symbol sequence quadrangle;

determining base lines based on the symbol quadrangles; and determining a median string quadrangle based on the symbol quadrangles.

19. A computer-readable non-transitory storage medium comprising executable instructions that, when executed by a processing device, cause the processing device to:

receive a current image of a series of images of an original document, wherein the current image at least partially overlaps with a previously received image of the series of images;

perform optical character recognition (OCR) of the current image to produce a current symbol sequence and coordinates of a current symbol sequence quadrangle containing the symbol sequence in the current image;

associate, using a coordinate transformation, the current symbol sequence with a previous symbol sequence for the previously received image, wherein the previously received image has corresponding coordinates of a previous symbol sequence quadrangle containing the previous symbol sequence;

identify a first median string representing the previous symbol sequence based on a first subset of previously received images of the series of images, wherein the first median string is a resulting OCR text representing at least a portion of the original document;

determine a median symbol sequence quadrangle for the previous symbol sequence quadrangles and the current symbol sequence quadrangle; and display, using the median symbol sequence quadrangle, a resulting OCR text representing at least a portion of the original document.

20. The storage medium of claim 19, wherein to display, using the median symbol sequence quadrangle, a resulting OCR text, the processing device is further to:

determine symbol quadrangles for symbols of the first median string based on the median symbol sequence quadrangle;

determine base lines based on the symbol quadrangles; and determine a median string quadrangle based on the symbol quadrangles.

\* \* \* \* \*